United States Patent
Odamura (10) Patent No.: US 6,765,553 B1
(45) Date of Patent: Jul. 20, 2004

(54) HANDY COMMUNICATION TERMINAL AND METHOD OF SCROLLING DISPLAY SCREEN OF THE SAME

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/294,196

(22) Filed: Apr. 20, 1999

(30) Foreign Application Priority Data

Apr. 22, 1998 (JP) ............................................ 10-112179

(51) Int. Cl.⁷ .............................................. G09G 5/00
(52) U.S. Cl. ..................... 345/156; 345/157; 345/158; 345/160; 345/168; 345/169; 345/173; 345/901
(58) Field of Search .............................. 345/156, 157, 345/158, 160, 169, 168, 173, 901

(56) References Cited

U.S. PATENT DOCUMENTS

| | | | | |
|---|---|---|---|---|
| 5,142,655 A | * | 8/1992 | Drumm ....................... | 379/52 |
| 5,465,207 A | * | 11/1995 | Boatwright et al. ... | 364/424.01 |
| 5,602,566 A | * | 2/1997 | Motosyuku et al. ........ | 345/156 |
| 5,644,653 A | * | 7/1997 | Sunakawa et al. .......... | 382/187 |
| 5,873,070 A | * | 2/1999 | Bunte et al. ................... | 705/28 |
| 6,020,876 A | * | 2/2000 | Rosenberg et al. ......... | 345/157 |
| 6,118,986 A | * | 9/2000 | Harris et al. .................. | 455/90 |
| 6,201,554 B1 | * | 3/2001 | Lands ......................... | 345/169 |
| 6,466,198 B1 | * | 10/2002 | Feinstein .................... | 345/158 |

FOREIGN PATENT DOCUMENTS

| | | |
|---|---|---|
| EP | 0 805 389 A2 | 11/1997 |
| JP | 63-122393 | 5/1988 |
| JP | 63-311193 | 12/1988 |
| JP | H1-133127 | 5/1989 |
| JP | 2-140823 | 5/1990 |
| JP | 2-201566 | 8/1990 |
| JP | 5-197489 | 8/1993 |
| JP | H6-4208 | 1/1994 |
| JP | 6-149462 | 5/1994 |
| JP | 7-64754 | 3/1995 |
| JP | H7-64754 | 3/1995 |
| JP | 7-134641 | 5/1995 |
| JP | 9-508729 | 9/1997 |
| JP | 10-28293 | 1/1998 |
| JP | 10-49290 | 2/1998 |
| JP | 10-49337 | 2/1998 |
| WO | WO 98/14863 | 4/1998 |

OTHER PUBLICATIONS

Tilting operations for small screen interfaces by "Jun Rekimoto" Nov. 6–8, 1996, Seattle, washington.*

C. Verplaetse, "Inertial proprioceptive devices: Self–motion–sensing toys and tools", *IBM Technical Journal*, 1996, (http://www.research.ibm.com/journal/sj/mit/sectione/verplaetse.txt).

* cited by examiner

*Primary Examiner*—Richard Hjerpe
*Assistant Examiner*—Jean Lesperance
(74) *Attorney, Agent, or Firm*—Sughrue Mion, PLLC (57) ABSTRACT

There is provided a handy terminal including (a) a body, (b) a central processing unit housed in the body, (c) a display screen equipped at a surface of the body, displaying therein data instructed by the central processing unit, (d) a display controller controlling an operation of the display screen in accordance with a display control signal transmitted from the central processing unit, and (e) an inclination detector detecting a direction in which the body is inclined and an inclination angle by which the body is inclined, and transmitting an inclination-indicating signal indicative of the thus detected inclination direction and angle of the body to the central processing unit. The central processing unit transmits a display control signal indicative of the detected inclination direction and angle of the body to the display controller, which scrolls the data displayed in the display screen in accordance with the received display control signal. In accordance with the handy terminal, it is possible to scroll data displayed in a display screen merely by inclining a body of the handy terminal, which ensures an operator to handle the handy terminal with one hand.

13 Claims, 8 Drawing Sheets

HANDY COMMUNICATION TERMINAL AND METHOD OF SCROLLING DISPLAY SCREEN OF THE SAME

BACKGROUND OF THE INVENTION

1. Field of the Invention

The invention relates to a handy terminal such as PDA, a hand-held computer and an E-mail viewer, and a method of controlling display in a display screen.

2. Description of the Related Art

A handy terminal such as PDA, a hand-held computer and an E-mail viewer is advantageous in that it can be handled with one hand.

A conventional handy terminal is usually designed to have a shift key such as a cross-shaped key. An area for displaying document data in a display screen may be scrolled by means of such a shift key, and a cursor may be moved in vertical and horizontal directions. When an operator scrolls such a display area or moves a cursor in a desired direction, an operator usually holds a handy terminal with one hand, and makes display area scrolling operation or cursor moving operation with the other hand.

However, since a display screen of a handy terminal is quite small in size, it is necessary to often scroll data displayed in a display screen, when document such as E-mail is to be viewed.

In addition, since a display area in a display screen is scrolled and a cursor is moved in a display screen both by means of a shift key, an operator has to hold a handy terminal with one hand, and operate a shift key with the other hand. As a result, an operator cannot do anything with his or her hands while he or she is operating a handy terminal.

Japanese Unexamined Patent Publication No. 5-197489 has suggested an X-Y coordinate input device detecting a direction in which a ball is rotated and an angle by which a ball is rotated. The X-Y coordinate input device is applied to a display device such as CRT, for instance.

Japanese Unexamined Patent Publication No. 6-149462 has suggested a data processing apparatus and an input control apparatus accomplishing click input operation equivalent to button-click of a mouse or pen-click, when an input panel is to be operated by means of a pen having no physical switch.

Japanese Unexamined Patent Publication No. 9-508729, based on the international patent application PCT/US95/00806 to which U.S. patent application Ser. No. 08/189,974 is assigned, has suggested a handy electronic pencil. The handy electronic pencil is comprised of a top point with which an operator writes on a screen, and a pressure sensor equipped in the top point and transmitting a signal when the top point makes contact with the screen.

SUMMARY OF THE INVENTION

It is an object of the present invention to provide a handy terminal which makes it possible for an operator to scroll a display area in a display screen and move a cursor in a display screen with one hand.

In one aspect, there is provided a handy terminal including (a) a body, (b) a central processing unit housed in the body, (c) a display screen equipped at a surface of the body, displaying therein data instructed by the central processing unit, (d) a display controller controlling an operation of the display screen in accordance with a display control signal transmitted from the central processing unit, and (e) an inclination detector detecting a direction in which the body is inclined and an inclination angle by which the body is inclined, and transmitting an inclination-indicating signal indicative of the thus detected inclination direction and angle of the body to the central processing unit, the central processing unit transmitting a display control signal indicative of the thus detected inclination direction and angle of the body to the display controller, the display controller scrolling the data displayed in the display screen in accordance with the display control signal.

It is preferable that the handy terminal further includes (f) one of an antenna making radio communication therethrough and an interface making wire communication, (g) a transceiver modulating data to be transmitted and demodulating received data, and (h) a communication controller controlling communication protocol.

For instance, the display controller may be designed to scroll the data displayed in the display screen in a direction in which the body is inclined.

It is preferable that the central processing unit transmits the display control signal only when the inclination angle of the body is equal to or greater than a threshold angle.

For instance, the inclination detector may be designed to detect inclination angle of the body in at least one of X- and Y-axes direction(s).

For instance, the inclination detector may be designed to detect inclination of the body in all directions, in which case, the central processing unit transmits a display control signal indicative of a single direction resulting from synthesizing the thus detected all inclination directions of the body, to the display controller.

It is preferable that the central processing unit causes the display controller to keep the data displayed in the display screen for a predetermined period of time after the display controller have scrolled the data in the display screen.

There is further provided a handy terminal including (a) a body, (b) a central processing unit housed in the body, (c) a display screen equipped at a surface of the body, displaying therein data instructed by the central processing unit, (d) a display controller controlling an operation of the display screen in accordance with a display control signal transmitted from the central processing unit, (e) an inclination detector detecting a direction in which the body is inclined and an inclination angle by which the body is inclined, and transmitting an inclination-indicating signal indicative of the thus detected inclination direction and angle of the body to the central processing unit, and (f) an on-off switch equipped with the body and operated by an operator, the inclination detector establishing an initial angle which is an inclination angle of the body to be made when the on-off switch is turned on, and detecting an inclination angle of the body on the basis of the thus established initial angle, the central processing unit transmitting a display control signal indicative of the thus detected inclination direction and angle of the body to the display controller, the display controller scrolling the data displayed in the display screen in accordance with the display control signal.

There is still further provided a handy terminal including (a) a body, (b) a central processing unit housed in the body, (c) a display screen equipped at a surface of the body, displaying therein data instructed by the central processing unit, (d) a display controller controlling an operation of the display screen in accordance with a display control signal transmitted from the central processing unit, (e) an inclination detector detecting a direction in which the body is inclined and an inclination angle by which the body is inclined, and transmitting an inclination-indicating signal indicative of the thus detected inclination direction and angle of the body to the central processing unit, and (f) a selection switch equipped with the body and operated by an operator, selecting the data or a cursor, the central processing unit transmitting a display control signal indicative of the thus detected inclination direction and angle of the body to the display controller, the display controller scrolling the data displayed in the display screen in accordance with the display control signal when the data is selected by the operator through the selection switch, or moving the cursor in the display screen in accordance with the display control signal when the cursor is selected by the operator through the selection switch.

There is yet further provided a handy terminal including (a) a body, (b) a central processing unit housed in the body, (c) a display screen equipped at a surface of the body, displaying therein data instructed by the central processing unit, (d) a display controller controlling an operation of the display screen in accordance with a display control signal transmitted from the central processing unit, (e) an inclination detector detecting a direction in which the body is inclined and an inclination angle by which the body is inclined, and transmitting an inclination-indicating signal indicative of the thus detected inclination direction and angle of the body to the central processing unit, and (f) a vibration detector detecting vibration of the body and transmitting a vibration-indicating signal on detection of vibration of the body, the central processing unit transmitting a display control signal indicative of the thus detected inclination direction and angle of the body to the display controller, the display controller moving a cursor in the display screen in accordance with the display control signal, and finalizing the cursor's position on receiving the vibration-indicating signal.

For instance, the vibration detector may be designed to detect Z-axis vibration of the body, provided that the body defines X-Y plane.

In another aspect, there is provided a method of scrolling data displayed in a display screen of a handy terminal, including the steps of (a) detecting a direction in which a body of a handy terminal is inclined and an inclination angle by which the body is inclined, and (b) scrolling data displayed in a display screen of the handy terminal in accordance with the inclination direction and angle detected in the step (a).

For instance, the data may be scrolled in the display screen in a direction in which the body is inclined in the step (b).

It is preferable that the data is scrolled in the display screen in the step (b) only when the inclination angle of the body is equal to or greater than a threshold angle.

It is preferable that inclination angle of the body in at least one of X- and Y-axes direction(s) is detected in the step (a).

It is preferable that inclination of the body in all directions is detected in the step (a), in which case, the data is scrolled in the display screen in the step (b) preferably in a single direction resulting from synthesizing the thus detected all inclination directions of the body.

The method may further include the step (c) of keeping the data displayed in the display screen for a predetermined period of time after the data has been scrolled in the display screen.

There is further provided a method of scrolling data displayed in a display screen of a handy terminal, including the steps of (a) determining an initial angle which is a certain inclination angle of a body of a handy terminal, (b) detecting a direction in which a body of a handy terminal is inclined and an inclination angle by which the body is inclined, the inclination angle being detected on the basis of the initial angle determined in the step (a), and (c) scrolling data displayed in a display screen of the handy terminal in accordance with the inclination direction and angle detected in the step (b).

For instance, the initial angle may be determined in the step (a) by an operator actuating a switch equipped with the body of the handy terminal.

There is still further provided a method of scrolling data displayed in a display screen of a handy terminal and moving a cursor in a display screen of a handy terminal, including the steps of (a) selecting first or second operation to be carried out, (b) detecting a direction in which a body of a handy terminal is inclined and an inclination angle by which the body is inclined, and (c) scrolling data displayed in a display screen of the handy terminal in accordance with the inclination direction and angle detected in the step (b) when the first operation has been selected in the step (a), or moving a cursor in the display screen in accordance with the inclination direction and angle detected in the step (b) when the second operation has been selected in the step (a).

For instance, the first or second operation may be selected in the step (a) by an operator actuating a switch equipped with the body of the handy terminal.

There is yet further provided a method of moving a cursor in a display screen of a handy terminal, including the steps of (a) detecting a direction in which a body of a handy terminal is inclined and an inclination angle by which the body is inclined, (b) moving a cursor in the display screen in accordance with the inclination direction and angle detected in the step (a), (c) detecting vibration of the body, and (d) finalizing the cursor's position when vibration of the body is detected in the step (c).

For instance, Z-axis vibration of the body is detected in step (c), provided that the body defines X-Y plane.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

[First Embodiment]

Figure 1:
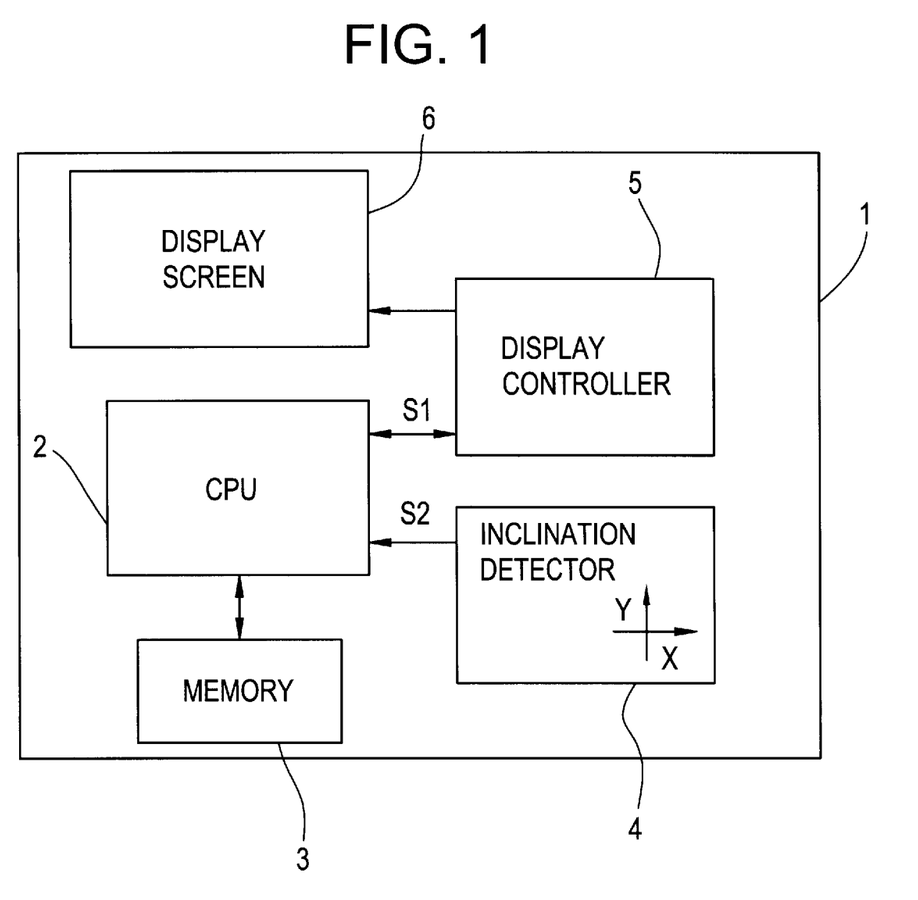
FIG. 1 is a block diagram of a handy terminal in accordance with the first embodiment of the present invention.

FIG. 1 illustrates a handy terminal in accordance with the first embodiment of the present invention.

As illustrated in FIG. 1, a handy terminal in accordance with the first embodiment includes a body 1 equipped with a central processing unit (CPU) 2 which processes data, a memory 3 storing therein data of E-mail text, for instance, a display screen 6 on which E-mail text is displayed and which is comprised of a liquid crystal display (LCD), a display controller 5 which controls an operation of the display screen 6 in accordance with a display control signal S1 transmitted from CPU 2, and an inclination detector 4 which detects a direction in which the body 1 is inclined and an inclination angle by which the body 1 is inclined, and transmits an inclination-indicating signal S2 indicative of the thus detected inclination direction and angle of the body 1 to CPU 2.

The inclination detector 4 in the instant embodiment is designed to detect horizontal inclination of the body 1.

An operation of the handy terminal illustrated in FIG. 1 is explained hereinbelow with reference to FIGS. 2 and 3.

Data such as E-mail and text document is stored in the memory 3. In operation, CPU 2 causes the display controller 5 to display such data stored in the memory 3, in the display screen 6 in accordance with a request of an operator.

The handy terminal in accordance with the instant embodiment is small in size. Accordingly, a display area in the display screen 6 is also small. As a result, when an operator sees data which overflows the display screen 6, the operator has to scroll the display screen 6 to thereby see data overflowing the display screen 6.

In accordance with the handy terminal, an operator can scroll the display screen 6 merely by inclining the body 1 of the handy terminal. When the body 1 is inclined, the inclination detector 4 detects inclination of the body 1. Specifically, the inclination detector 4 detects a direction in which the body 1 is inclined and a degree by which the body 1 is inclined. Thereafter, the inclination detector 4 transmits the inclination-indicating signal S2 indicative of the thus detected inclination direction and angle of the body 1, to CPU 2. Then, CPU 2 transmits the display control signal S1 indicative of the thus detected inclination direction and angle of the body 1 to the display controller 5, and the display controller 5 scrolls data displayed in the display screen 6 in accordance with the display control signal S1.

Figure 2:
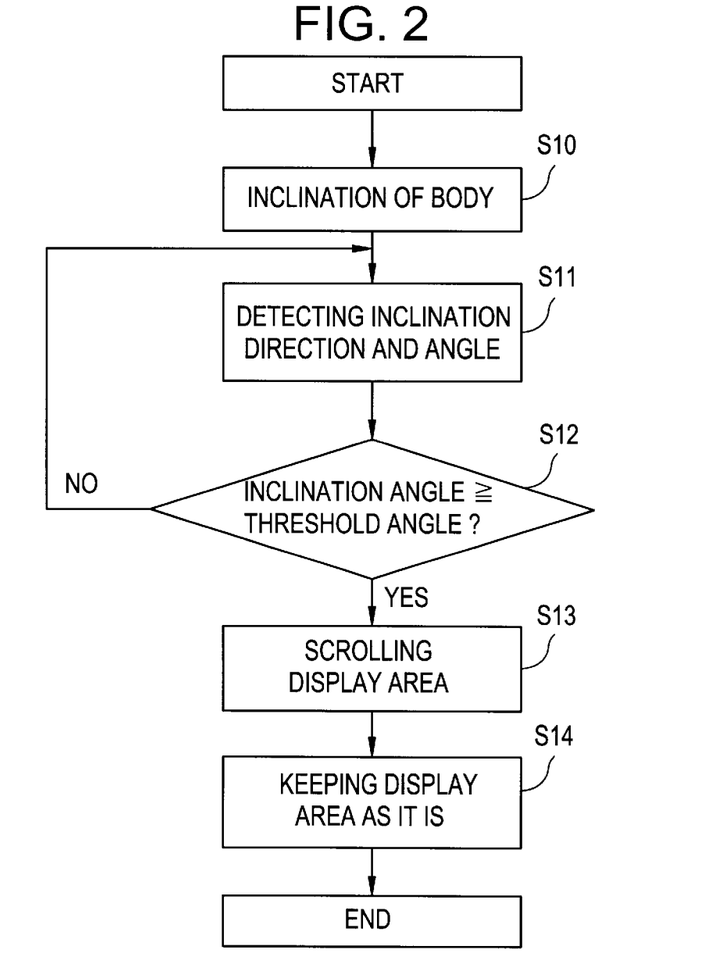
FIG. 2 is a flow chart of an operation of the handy terminal illustrated in FIG. 1.

FIG. 2 is a flow chart showing an operation of the handy terminal in accordance with the first embodiment.

When an operator would like to scroll a display area in the display screen 6, the operator inclines the body 1 in step S10.

When the body 1 is inclined by the operator, the inclination detector 4 in the body 1 detects a direction in which the body 1 is inclined and an angle by which the body 1 is inclined, in step S11.

The thus detected inclination angle of the body 1 is compared to a predetermined threshold angle in CPU 2 in step S12. If the inclination angle is smaller than the predetermined threshold angle (NO in step S12), the procedure stops until the body 1 is inclined next time.

If the inclination angle is equal to or greater than the predetermined threshold angle (YES in step S12), a display area in the display screen 6 is scrolled in step S13 in the detected inclination direction by a distance associated with the detected inclination angle.

Then, the thus scrolled display area is kept as it is for a certain period of time, for instance, for 5 seconds, for the operator to adequately see the scrolled data, in step S14.

In operation, the inclination detector 4 detects both an angle by which the body 1 is inclined in an X-axis direction, and an angle by which the body 1 is inclined in a Y-axis direction, as well as a direction in which the body 1 is inclined. If the body 1 is inclined in an X-axis direction, a display area in the display screen 6 is scrolled in the X-axis direction by a distance associated with the detected inclination angle in the X-axis, whereas if the body 1 is inclined in a Y-axis direction, a display area in the display screen 6 is scrolled in the Y-axis direction by a distance associated with the detected inclination angle in the Y-axis.

If the body 1 is inclined in both X- and Y-axes directions, the inclination detector 4 detects that the body 1 is inclined in X- and Y-axes directions, and also detects angles by which the body 1 is inclined in X- and Y-axes directions, respectively. Then, the inclination detector 4 transmits the inclination-indicating signal S2 to CPU 2. This inclination-indicating signal S2 indicates that the body 1 is inclined in both X- and Y-axes directions, and also indicates the inclination angles in X- and Y-axes directions. Receiving the inclination-indicating signal S2, CPU 2 synthesizes directions in which the body 1 is inclined and angles in X- and Y-axes by which the body 1 is inclined, respectively, to thereby produce a single direction and an angle both resulting from synthesizing the directions and angles. Then, CPU 2 transmits a display control signal S1 indicative of the thus produced single direction and angle, to the display controller 5. The display controller 5 scrolls a display area in the display screen 6 in the thus produced single direction by a distance associated with the thus produced angle.

Figure 3:
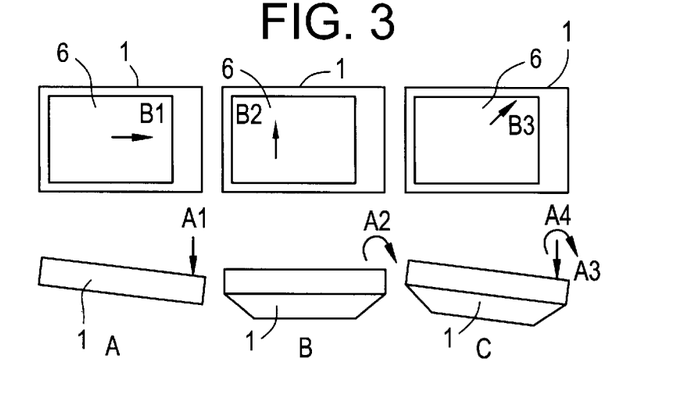
FIG. 3 illustrates examples of display control in the handy terminal illustrated in FIG. 1.

FIG. 3 illustrates examples of scrolling a display area in the display screen 6 in accordance with the display control signal S1 transmitted from CPU 2.

In FIG. 3-A, the body 1 is inclined in an X-axis direction. Specifically, a right side of the body 1 is downwardly inclined as indicated with an arrow A1 relative to a horizontal direction. As a result, letters displayed in the display screen 6 are scrolled to the right as indicated with an arrow B1. A distance by which the letters are scrolled to the right is in proportion to an angle by which the body 1 is inclined in a direction indicated with the arrow A1.

In FIG. 3-B, the body 1 is inclined in a Y-axis direction. Specifically, a front side of the body 1 is downwardly inclined as indicated with an arrow A2 relative to a horizontal direction. As a result, letters displayed in the display screen 6 are scrolled towards an upper side as indicated with an arrow B2. A distance by which the letters are scrolled to the upper side is in proportion to an angle by which the body 1 is inclined in a direction indicated with the arrow A2.

In FIG. 3-C, the body 1 is inclined in both X- and Y-axes directions. Specifically, both a right side and a front side of the body 1 are downwardly inclined as indicated with arrows A3 and A4 relative to a horizontal direction. As a result, letters displayed in the display screen 6 are scrolled towards an upper and right edge of the display screen 6, as indicated with an arrow B3. A distance by which the letters are scrolled to the upper and right edge is in proportion to an angle resulting from synthesis of an angle by which the body 1 is inclined in a direction indicated with the arrow A3 and an angle by which the body 1 is inclined in a direction indicated with the arrow A4.

[Second Embodiment]

Figure 4:
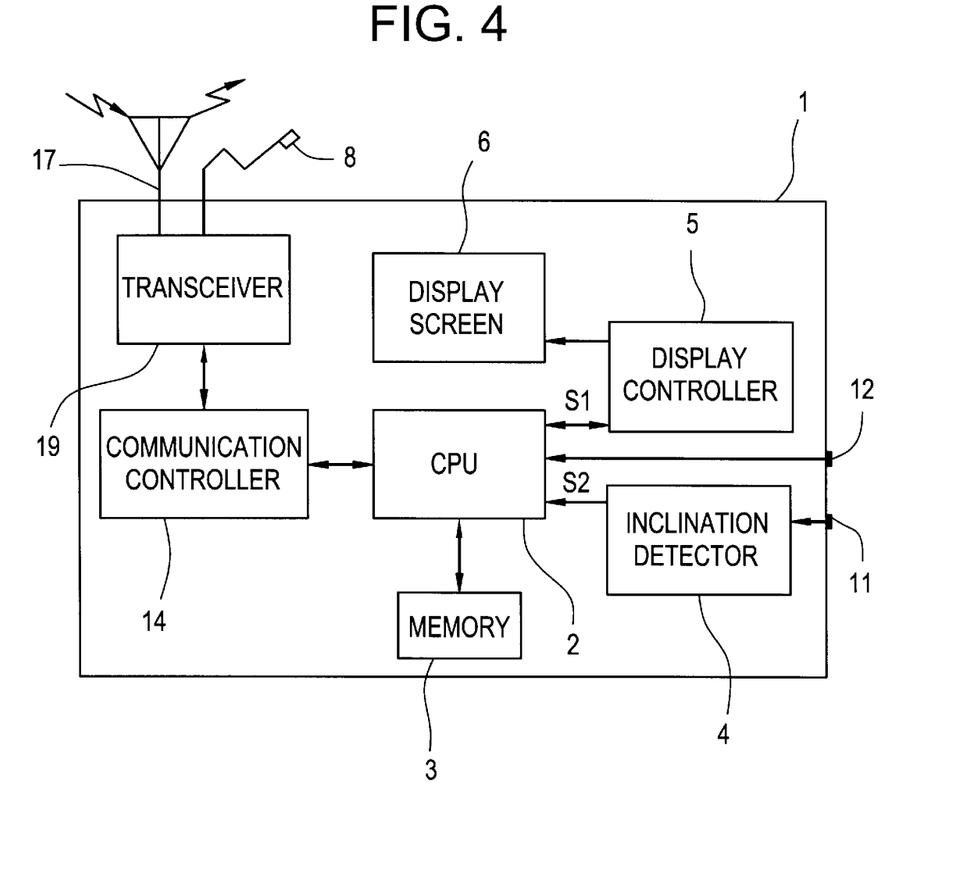
FIG. 4 is a block diagram of a handy terminal in accordance with the second embodiment of the present invention.

FIG. 4 is a block diagram of a handy terminal in accordance with the second embodiment. In the second embodiment, the handy terminal is designed to have radio and wire communication functions.

As illustrated in FIG. 4, the handy terminal in accordance with the second embodiment includes a body 1, in which the handy terminal is comprised of a central processing unit (CPU) 2 which processes data, a memory 3 storing therein data of E-mail text, for instance, a display screen 6 on which E-mail text is displayed and which is comprised of a liquid crystal display (LCD), a display controller 5 which controls an operation of the display screen 6 in accordance with a display control signal S1 transmitted from CPU 2, an inclination detector 4 which detects a direction in which the body 1 is inclined and an inclination angle by which the body 1 is inclined, and transmits an inclination-indicating signal S2 indicative of the thus detected inclination direction and angle of the body 1 to CPU 2, an antenna 17 making radio communication therethrough, a transceiver 19 modulating data to be transmitted and demodulating data received through the antenna 17, and a communication controller 14 which controls communication protocol, an on-off switch 11, and a selection switch 12.

The handy terminal may be designed to include an interface 8 which makes wire communication, in place of or together with the antenna 17.

The on-off switch 11 is operated by an operator. When an operator would like to scroll a display area in the display screen 6 or move a cursor in the display screen 6, an operator turns the on-off switch 11 on. When the on-off switch 11 is turned on by an operator, the inclination detector 4 establishes an initial angle which is an inclination angle of the body 1 to be made when the on-off switch 11 is just turned on, and detects an inclination angle of the body 1 on the basis of the thus established initial angle.

The selection switch 12 is operated also by an operator to select a display area or data to be scrolled or a cursor to be moved. When a display area or data is selected by the operator through the selection switch 12, the display controller 5 scrolls data displayed in the display screen 6 in accordance with the display control signal S1. When a cursor is selected by the operator through said selection switch 12, the display controller 5 moves the cursor in the display screen 6 in accordance with the display control signal S1.

Figure 5:
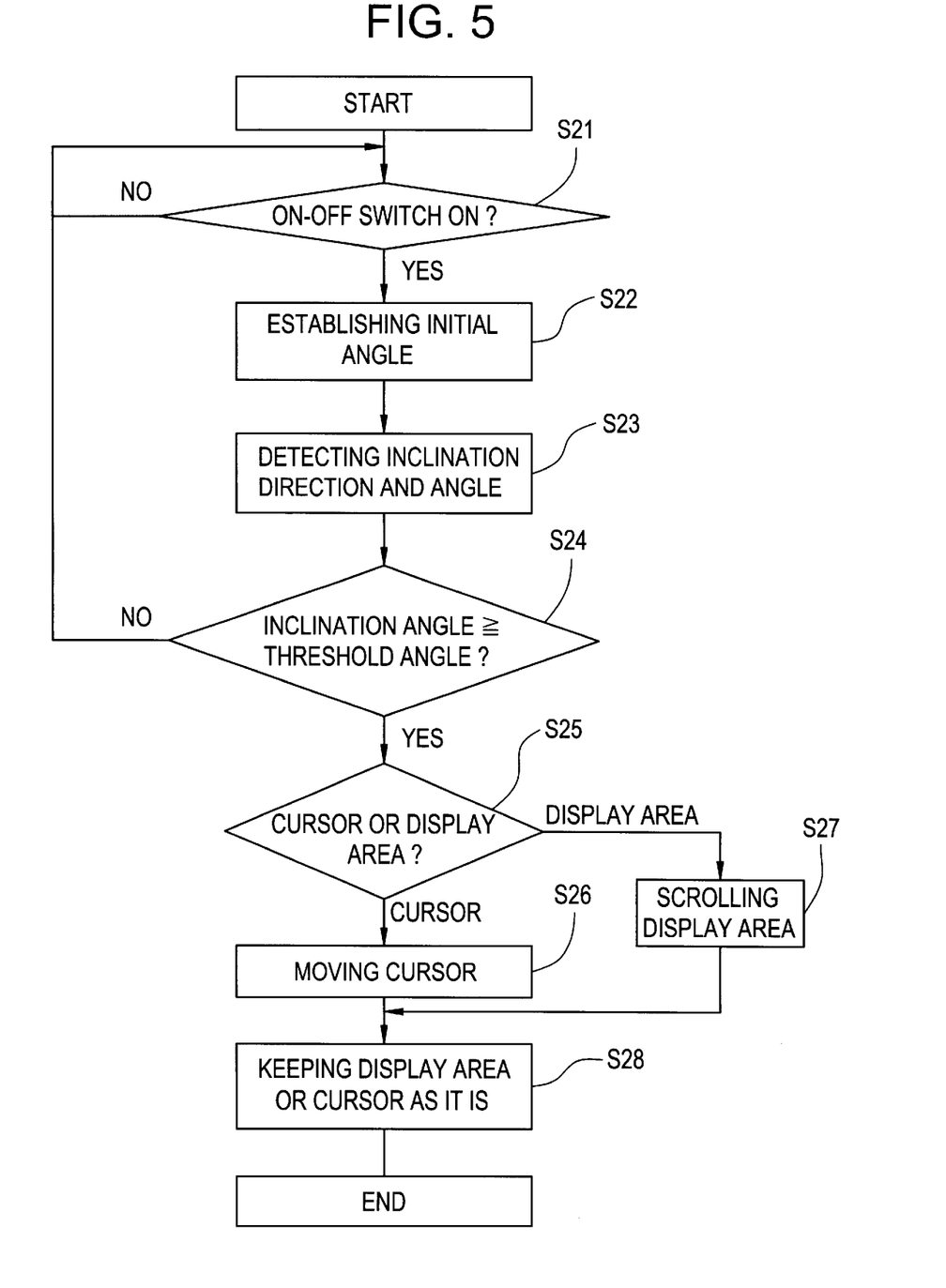
FIG. 5 is a flow chart of an operation of the handy terminal illustrated in FIG. 4.

FIG. 5 is a flow chart showing an operation of the handy terminal in accordance with the instant embodiment. Hereinbelow is explained an operation of the handy terminal with reference to FIG. 5 as well as FIG. 4.

Message data received in the antenna 17 through aerial wire is demodulated in the transceiver 19. Message data to be transmitted from the handy terminal is modulated in the transceiver 19, and transmitted from the antenna 17 through aerial wire.

The demodulated message data is transmitted from the transceiver 19 to the communication controller 14, and processed with respect to communication protocol. Thereafter, the message data is transmitted to CPU 2, which stores the received message data in the memory 3. CPU 2 applies necessary treatment to the received message data, and thereafter, transmits the message data to the display controller 5. The display controller 5 displays the message data in the display screen 6.

With reference to FIG. 5, when an operator would like to scroll a display area in the display screen 6 or move a cursor in the display screen 6, the operator turns the on-off switch 11 on in step S21 to thereby put the handy terminal in a condition for allowing a display area to be scrolled or a cursor to be moved.

If an operator has to handle the handy terminal with one hand, it would be difficult to keep the body 1 of the handy terminal horizontal. Accordingly, if the inclination detector 4 detects an inclination angle of the body 1 relative to a horizontal direction, it would not be possible to detect an actual inclination angle of the body 1.

Hence, when the on-off switch 11 is turned on by an operator in step S21, the inclination detector 4 establishes an initial angle in step S22. Herein, the initial angle is an inclination angle of the body 1 to be made when the on-off switch 11 is just turned on.

Then, the inclination detector 4 detects an inclination angle of the body 1 on the basis of the thus established initial angle in step S23.

Figure 6:
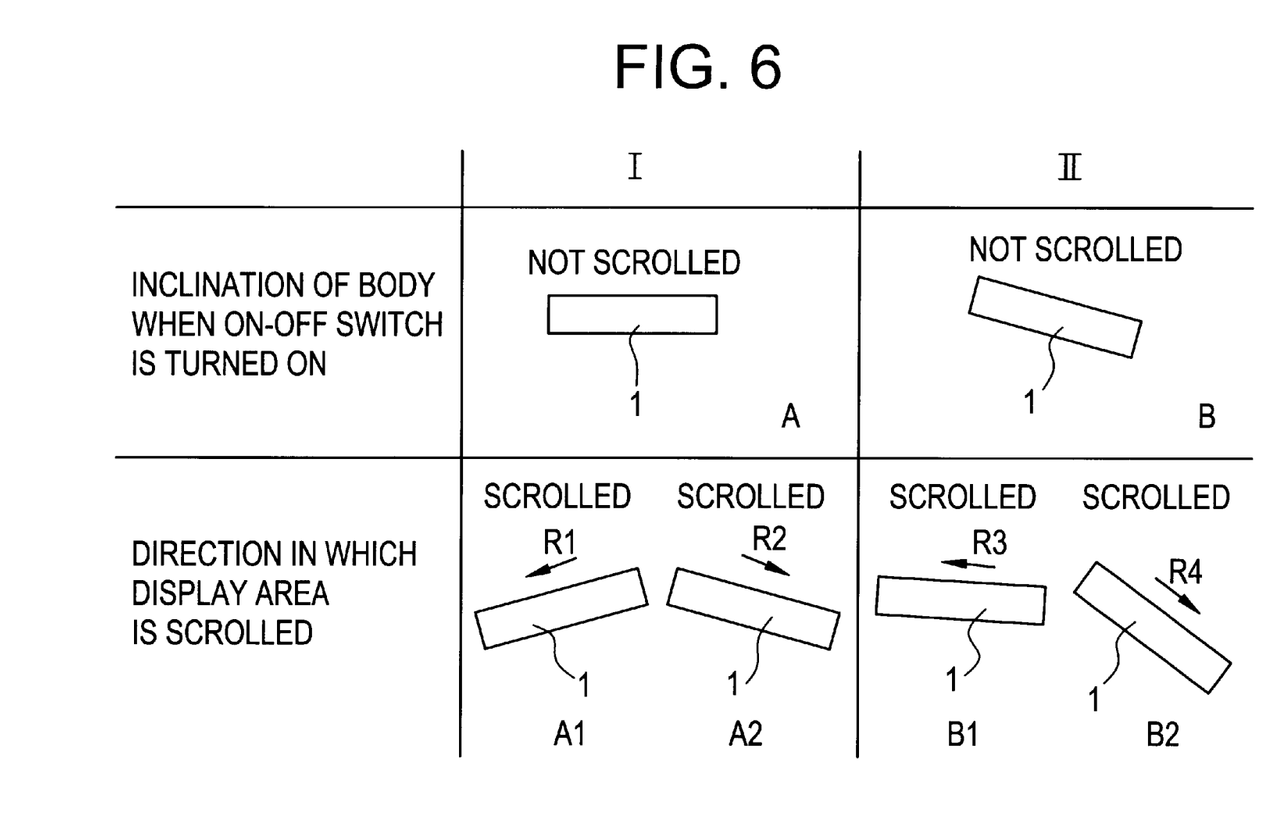
FIG. 6 illustrates examples of display control in the handy terminal illustrated in FIG. 4.

FIG. 6 illustrates examples I and II each showing a relation between an inclination angle of the body 1 formed when the on-off switch 11 is turned on and a direction in which a display area is scrolled or a cursor is moved.

In the example I, the body 1 of the handy terminal stands in a horizontal direction when the on-off switch 11 is turned on, as illustrated in FIG. 6-A. In this state, a display area in the display screen 6 is stopped from being scrolled, and a cursor is stopped from moving in the display screen 6. If the body 1 is downwardly inclined at a left side thereof as illustrated in FIG. 6-A1, a display area in the display screen 6 is scrolled or a cursor is moved to the left as indicated with an arrow R1. If the body 1 is downwardly inclined at a right side thereof as illustrated in FIG. 6-A2, a display area in the display screen 6 is scrolled or a cursor is moved to the right as indicated with an arrow R2.

In the example II, the body 1 of the handy terminal is downwardly inclined at a right side thereof when the on-off switch 11 is turned on, as illustrated in FIG. 6-B. In this state, a display area in the display screen 6 is stopped from being scrolled, and a cursor is stopped from moving in the display screen 6. If the body 1 is upwardly inclined at a right side thereof as illustrated in FIG. 6-B1, a display area in the display screen 6 is scrolled or a cursor is moved to the left as indicated with an arrow R3, though the body 1 of the handy terminal still remains downwardly inclined at a right side thereof. If the body 1 is further inclined downwardly at a right side thereof as illustrated in FIG. 6-B2, a display area in the display screen 6 is scrolled or a cursor is moved to the right as indicated with an arrow R4.

Referring back to FIG. 5, the inclination detector 4 transmits an inclination-indicating signal S2 indicative of the thus detected inclination direction and angle of the body 1 of the handy terminal, to CPU 2. Receiving the inclination-indicating signal S2, CPU 2 compares the inclination angle indicated in the inclination-indicating signal S2 to a predetermined threshold angle in step S24.

If the inclination angle is smaller than the predetermined threshold angle (NO in step S24), the procedure stops until the body 1 is inclined next time.

If the inclination angle is equal to or greater than the threshold angle (YES in step S24), CPU 2 then checks whether a display area or a cursor is selected by an operator through the selection switch 12, in step S25.

When a display area is selected by an operator through the selection switch 12, the display controller 5 scrolls a display area in the display screen 6 in step S27 in accordance with the display control signal S1 transmitted from CPU 2 to the display controller 5, indicative of the inclination direction and angle of the body 1.

When a cursor is selected by an operator through the selection switch 12, the display controller 5 moves a cursor in the display screen 6 in accordance with the display control signal S1, in step S26.

Then, the thus scrolled display area or moved cursor is kept as it is for a certain period of time, for instance, 5 seconds, for the operator to adequately see the scrolled data or moved cursor, in step S28.

Though the handy terminal in accordance with the second embodiment is designed to include both the on-off switch 11 and the selection switch 12, it should be noted that the handy terminal may be designed to include either the on-off switch 11 or the selection switch 12

For instance, if the handy terminal is designed to include the on-off switch 11, and not to include the selection switch 12, a display area in the display screen 6 is scrolled in accordance with inclination direction and angle of the body 1 detected by the inclination detector 4. Herein, the inclination angle is detected on the basis of the above-mentioned initial angle established by an operator by turning the on-off switch 11 on.

As an alternative, if the handy terminal is designed to include the selection switch 12, and not to include the on-off switch 11, a display area in the display screen 6 is scrolled or a cursor is moved in the display screen 6 in accordance with inclination direction and angle of the body 1 detected by the inclination detector 4. Herein, the inclination angle is detected relative to a horizontal direction.

[Third Embodiment]

Figure 7:
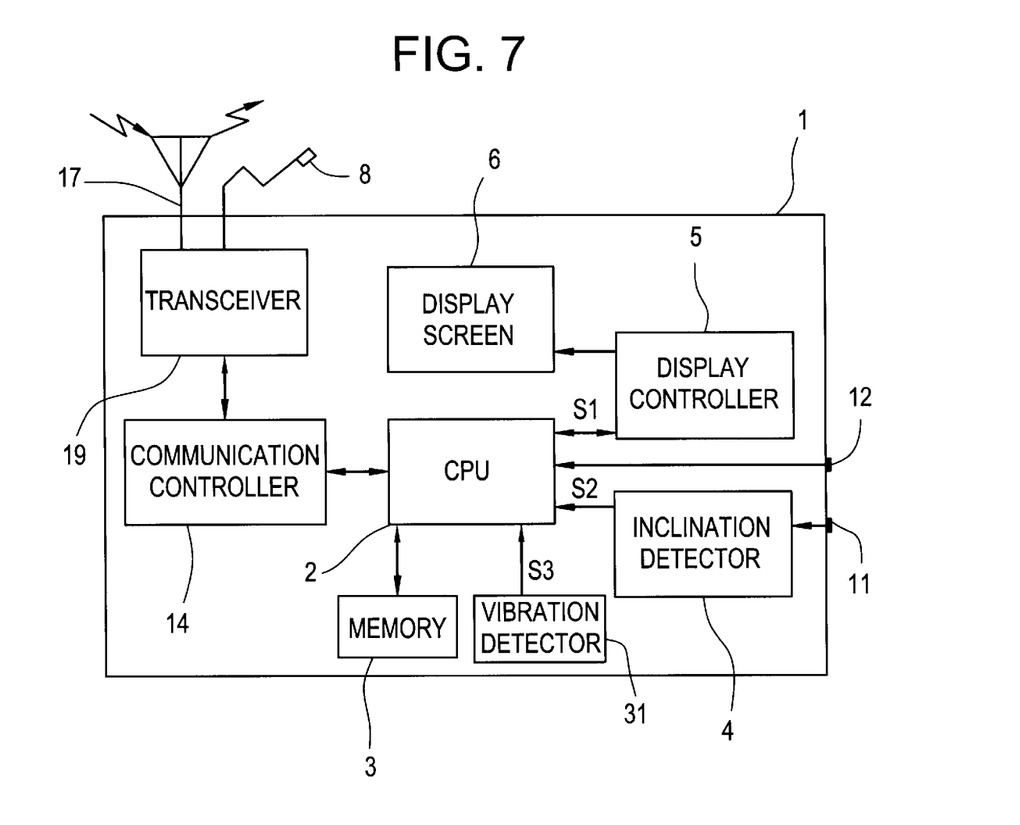
FIG. 7 is a block diagram of a handy terminal in accordance with the third embodiment of the present invention.

FIG. 7 is a block diagram of a handy terminal in accordance with the third embodiment. In the third embodiment, the handy terminal is designed to have radio and wire communication functions.

As illustrated in FIG. 7, the handy terminal in accordance with the second embodiment includes a body 1, in which the handy terminal is comprised of a central processing unit (CPU) 2 which processes data, a memory 3 storing therein data of E-mail text, for instance, a display screen 6 on which E-mail text is displayed and which is comprised of a liquid crystal display (LCD), a display controller 5 which controls an operation of the display screen 6 in accordance with a display control signal S1 transmitted from CPU 2, an inclination detector 4 which detects a direction in which the body 1 is inclined and an inclination angle by which the body 1 is inclined, and transmits an inclination-indicating signal S2 indicative of the thus detected inclination direction and angle of the body 1 to CPU 2, an antenna 17 making radio communication therethrough, a transceiver 19 modulating data to be transmitted and demodulating data received through the antenna 17, a communication controller 14 which controls communication protocol, an on-off switch 11, and a selection switch 12, and a vibration detector 31 detecting vibration of the body 1 and transmitting a vibration-indicating signal S3 to CPU 2 on detection of vibration of the body 1.

In brief, the handy terminal in accordance with the third embodiment has the same structure as that of the second embodiment, and additionally includes the vibration detector 31.

The vibration detector 31 detects Z-axis vibration of the body 1. Herein, an Z-axis is defined as an axis perpendicular to a plane defined by the body 1.

As explained later in detail, when an operator would like to finalize a cursor's position, an operator vibrates the body 1 of the handy terminal in an Z-axis direction. When the vibration detector 31 detects the Z-axis direction, the vibration detector 31 transmits the vibration-indicating signal S3 to CPU 2, which in turn causes the display controller 5 to finalize a cursor's position at a position where a cursor is located.

Figure 8A:
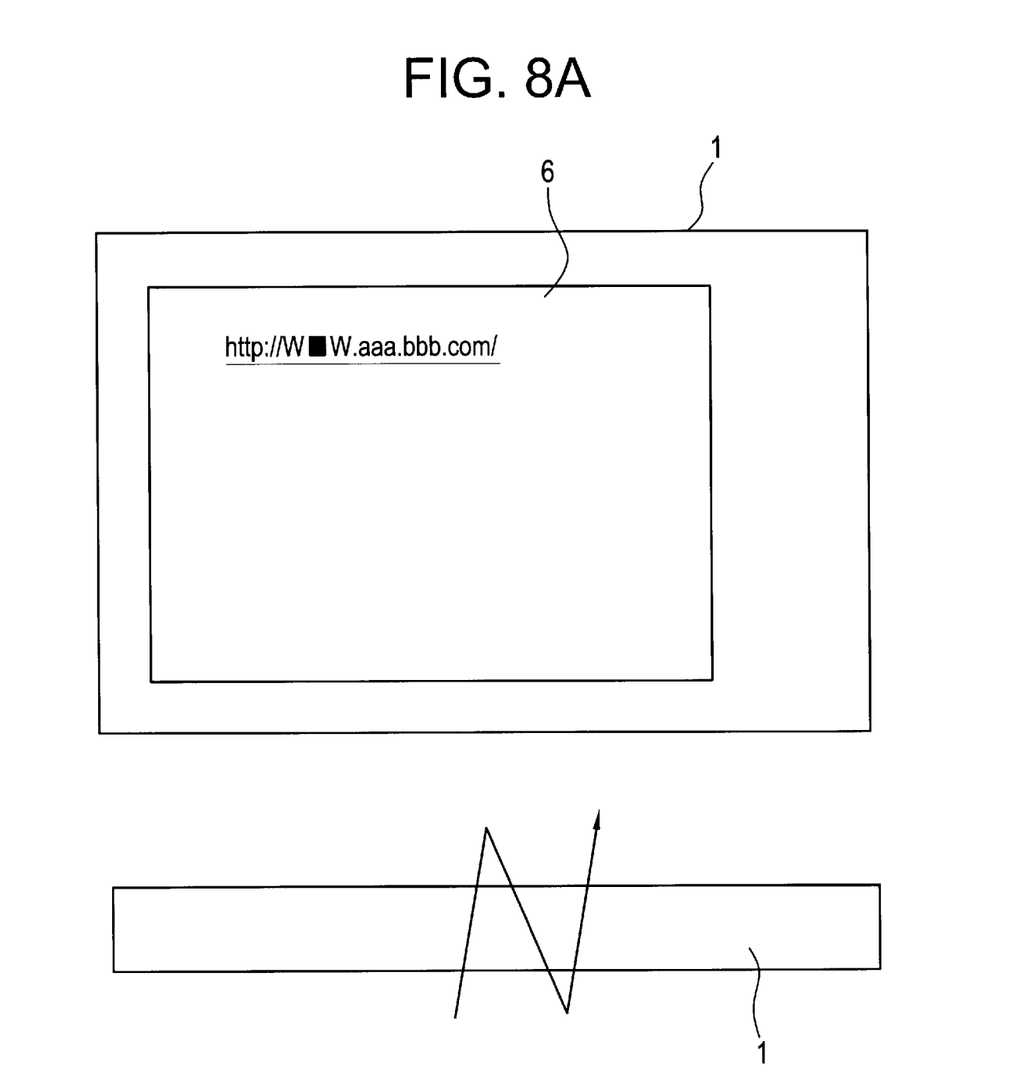
FIG. 8A illustrates a display screen in which a cursor positions on a letter, and also illustrates a direction in which a body of the handy terminal in accordance with the third embodiment is vibrated.
Figure 8B:
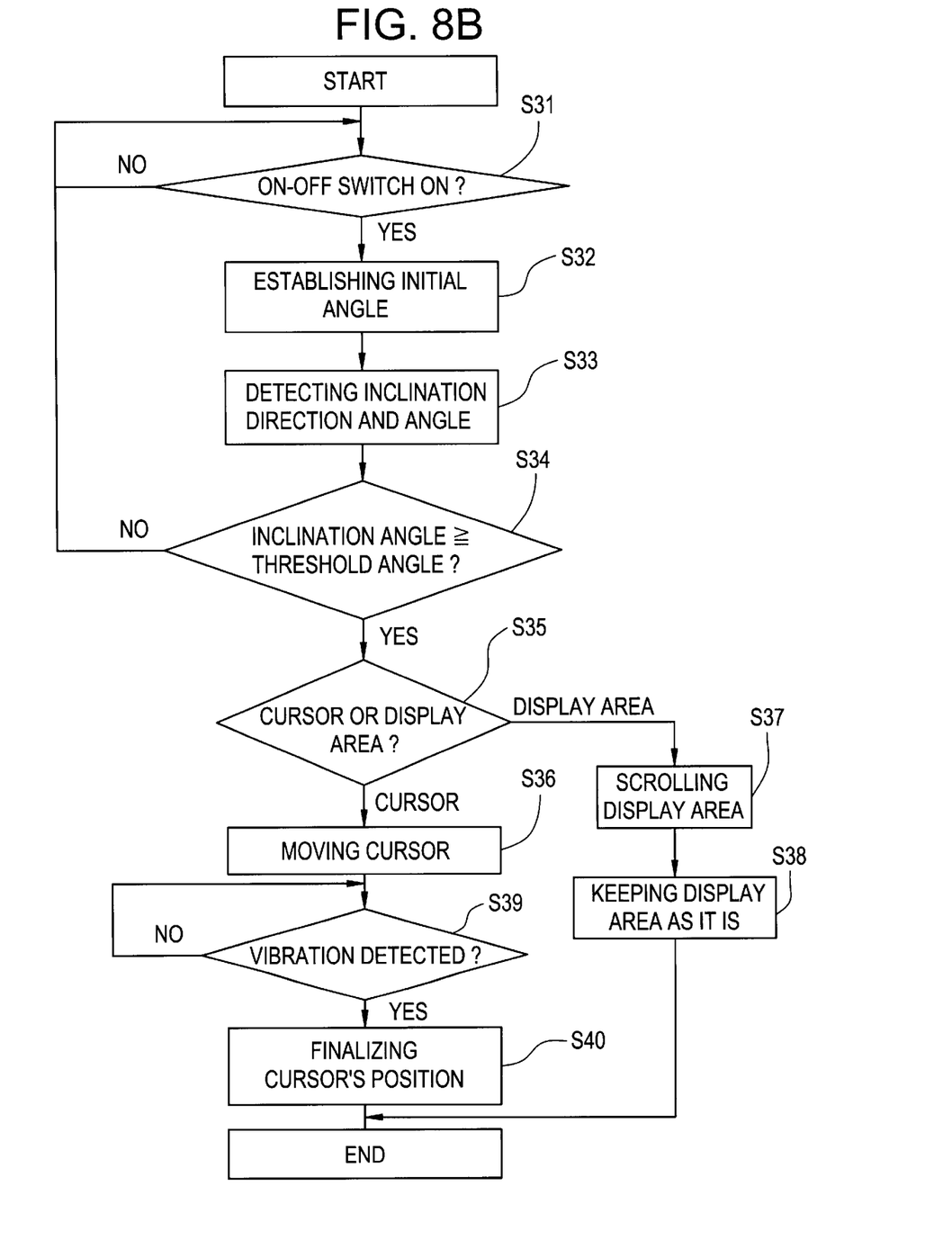
FIG. 8B is a flow chart of an operation of the handy terminal illustrated in FIG. 7.

FIG. 8A illustrates the body 1 being vibrated, and FIG. 8B is a flow chart showing an operation of the handy terminal in accordance with the instant embodiment. Hereinbelow is explained an operation of the handy terminal with reference to FIG. 8B.

With reference to FIG. 8B, when an operator would like to scroll a display area in the display screen 6 or move a cursor in the display screen 6, the operator turns the on-off switch 11 on in step S31 to thereby put the handy terminal in a condition for allowing a display area to be scrolled or a cursor to be moved.

When the on-off switch 11 is turned on by an operator in step S31, the inclination detector 4 establishes an initial angle in step S32.

Then, the inclination detector 4 detects an inclination angle of the body 1 on the basis of the thus established initial angle in step S33.

Then, the inclination detector 4 transmits an inclination-indicating signal S2 indicative of the thus detected inclination direction and angle of the body 1 of the handy terminal, to CPU 2. Receiving the inclination-indicating signal S2, CPU 2 compares the inclination angle indicated in the inclination-indicating signal S2 to a predetermined threshold angle in step S34.

If the inclination angle is smaller than the predetermined threshold angle (NO in step S34), the procedure stops until the body 1 is inclined next time.

If the inclination angle is equal to or greater than the threshold angle (YES in step S34), CPU 2 then checks whether a display area or a cursor is selected by an operator through the selection switch 12, in step S35.

When a display area is selected by an operator through the selection switch 12, the display controller 5 scrolls a display area in the display screen 6 in step S37 in accordance with the display control signal S1 transmitted from CPU 2 to the display controller 5, indicative of the inclination direction and angle of the body 1.

Then, the thus scrolled display area is kept as it is for a certain period of time, for instance, 5 seconds, for the operator to adequately see the scrolled data, in step S38.

When a cursor is selected by an operator through the selection switch 12, the display controller 5 moves a cursor in the display screen 6 in accordance with the display control signal S1, in step S36.

After the cursor has been moved, the vibration detector 31 monitors whether the body 1 of the handy terminal is vibrated in a Z-axis direction by an operator. If the vibration detector 31 detects that the body 1 has been vibrated in a Z-axis direction (YES in step S39), as illustrated in FIG. 8A, the vibration detector 31 transmits the vibration-indicating signal S3 to CPU 2. CPU 2 transmits the display control signal S1 to the display controller 5, which finalizes a cursor's position at a position where a cursor is presently located.

As having been explained so far, the present invention makes it possible for an operator to handle a handy terminal with one hand. Specifically, a display area in a display screen can be scrolled merely by inclining a body of the handy terminal. In addition, the handy terminal can be put in a condition for allowing a display area to be scrolled or a cursor to be moved merely by turning the on-off switch on. It is also possible to establish an initial angle, based on which an inclination angle of the body is detected, merely by turning the on-off switch on. An operator can select a display area to be scrolled or a cursor to be moved in a display screen through the selection switch. Furthermore, a cursor's position can be finalized merely by vibrating the body of the handy terminal.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-112179 filed on Apr. 22, 1998 including specification, claims, drawings and summary is incorporated herein by reference in its entirety.

What is claimed is:

1. A hand-held terminal comprising:
   (a) a body;
   (b) a central processing unit housed in said body;
   (c) a display screen provided at a surface of said body, displaying thereon data as instructed by said central processing unit;
   (d) a display controller controlling an operation of said display screen in accordance with a display control signal transmitted from said central processing unit;
   (e) an inclination detector detecting a direction in which said body is inclined and an inclination angle by which said body is inclined, and transmitting an inclination-indicating signal indicative of the thus detected inclination direction and angle of said body to said central processing unit; and
   (f) a vibration detector detecting vibration of said body and transmitting a vibration-indicating signal on detection of vibration of said body,
   said central processing unit transmitting a display control signal indicative of the thus detected inclination direction and angle of said body to said display controller,
   said display controller moving a cursor on said display screen in accordance with said display control signal, and finalizing said cursor's position on receiving said vibration-indicating signal.

2. The hand-held terminal as set forth in claim 1, wherein said vibration detector detects Z-axis vibration of said body, provided that said body defines an X-Y plane.

3. The hand-held terminal as set forth in claim 1, further comprising:
   (g) one of an antenna for radio communication and an interface for wired communication;
   (h) a transceiver modulating data to be transmitted and demodulating received data; and
   (i) a communication controller controlling communication protocol.

4. The hand-held terminal as set forth in claim 1, wherein said display controller scrolls said data displayed on said display screen in a direction in which said body is inclined.

5. The hand-held terminal as set forth in claim 1, wherein said central processing unit transmits said display control signal only when said inclination angle of said body is equal to or greater than a threshold angle.

6. The hand-held terminal as set forth in claim 1, wherein said inclination detector detects said inclination angle of said body in at least one of X- and Y-axis direction(s).

7. The hand-held terminal as set forth in claim 1, wherein said inclination detector detects inclination of said body in all directions, and said central processing unit transmits a display control signal indicative of a single direction resulting from synthesizing the thus detected inclination directions of said body, to said display controller.

8. The hand-held terminal as set forth in claim 1, wherein said central processing unit causes said display controller to maintain said data displayed on said display screen for a predetermined period of time after said display controller has scrolled said data on said display screen.

9. A method of moving a cursor in a display screen of a handy terminal, comprising the steps of:
   (a) detecting a direction in which a body of a handy terminal is inclined and an inclination angle by which said body is inclined;
   (b) moving a cursor in said display screen in accordance with the inclination direction and angle detected in said step (a);
   (c) detecting vibration of said body; and
   (d) finalizing said cursor's position when vibration of said body is detected in said step (c).

10. The method as set forth in claim 9, wherein Z-axis vibration of said body is detected in step (c), provided that said body defines X-Y plane.

11. The method as set forth in claim 9, wherein said cursor is moved in said display screen in said step (b) only when said inclination angle of said body is equal to or greater than a threshold angle.

12. The method as set forth in claim 9, wherein inclination angle of said body in at least one of X- and Y-axes direction(s) is detected in said step (a).

13. The method as set forth in claim 9, wherein inclination of said body in all directions is detected in said step (a), and said cursor is moved in said display screen in said step (b) in a single direction resulting from synthesizing the thus detected all inclination directions of said body.

* * * * *